United States Patent [19]
Hodgson

[11] Patent Number: 6,155,447
[45] Date of Patent: Dec. 5, 2000

[54] WORM FARM ORGANIZER INSERT FOR COMPOST BINS

[76] Inventor: Ian P. Hodgson, "Shepherds Gully"128 Eelah Rd., Mindaribba, New South Wales 2320, Australia

[21] Appl. No.: 09/254,318

[22] PCT Filed: Jun. 24, 1998

[86] PCT No.: PCT/AU98/00481

§ 371 Date: Mar. 4, 1999

§ 102(e) Date: Mar. 4, 1999

[87] PCT Pub. No.: WO99/01360

PCT Pub. Date: Jan. 14, 1999

[30] Foreign Application Priority Data

Jul. 4, 1997 [AU] Australia .................................. PO7698

[51] Int. Cl.⁷ .................................................. B65D 57/00
[52] U.S. Cl. ........................... 220/529; 220/528; 220/555
[58] Field of Search ...................... 220/528, 529, 220/501, 555; 119/6.7

[56] References Cited

U.S. PATENT DOCUMENTS 4,550,848  11/1985  Sucato ...................................... 220/501
5,370,258  12/1994  Fair ......................................... 220/719

FOREIGN PATENT DOCUMENTS 297 03 055 U1  6/1997  Germany .
WO 97/25295  7/1997  WIPO .

*Primary Examiner*—Paul T. Sewell
*Assistant Examiner*—Troy Arnold
*Attorney, Agent, or Firm*—Parkhurst & Wendel, L.L.P.

[57] ABSTRACT

The Worm Form Organizer Insert for Compost Bins is disclosed. The device is an insert designed for commercially available domestic anaerobic style compost bins and fits independently freestanding and self supporting within and comprises 2 central hubs (7,8), a framework (1) and barrier material (9) dividing the bin into three equal sections for the addition of compost, columns of compost can now be created within the compost bin. If these columns of compost are maintained at varying levels airflow and drainage will be provided via the barriers thereby creating an improved environment for compost worms which may be added to the compost.

14 Claims, 3 Drawing Sheets

WORM FARM ORGANIZER INSERT FOR COMPOST BINS

This invention relates to improvements in devices for production of household compost within commercially available domestic anaerobic style compost bins.

For many people it is difficult to maintain the correct environment for the production of quality compost in commercially available domestic anaerobic style compost bins. Unless regular maintenance is given to maintain aeration of the compost and correct moisture levels the compost may become odourous and too wet encouraging the establishment of compost fly maggots. This environment also creates an unsuitable habitat for compost worms whose presence is desirable as they aerate and consume the compost leaving worm castings.

Problems associated with aeration and maintaining correct moisture levels are reduced by the present invention, The Worm Farm Organiser Insert for Compost Bins which is designed to fit independently, freestanding and self supporting within commercially available domestic anaerobic style compost bins and provides two centrally located hubs, one upper and one lower both securing radiating "C" shaped frames placed so as to divide the internal space of the compost bin equally by three, the frames having a sturdy material secured to them creating three vertical barriers which allow the free passage of air so when the material for composting is placed within it a vertical column of compost will be formed, by maintaining columns of compost at varying heights airflow and drainage via the barriers is increased within the compost creating an improved habitat for compost worms which may be added to the compost.

In one form of the invention the centrally located hubs would be made of moulded resin or plastic having suitable metal or plastic threaded studs moulded within them and protruding from the base thereof with lugs on either side of the securing point to provide additional support in the case of plastic hubs, the studs being positioned so as to arrange the "C" shaped frames to radiate from the hub and form three equally sized open sided sections, the three "C" shaped frames being constructed of suitable metal having sections of appropriate length and having angles of appropriate size to create the shape necessary to neatly fit the compost bin for which the Worm Form Organiser Insert for Compost Bins is being manufactured, the two ends of each "C" shaped frame will be suitably flattened, with holes, probably two, to accommodate the studs which protrude from the top and bottom hubs, the "C" shaped frames and hubs will be secured to each other by means of suitable metal or plastic nuts to suit the threaded studs and the framework design is such that it supports and tensions a suitably manufactured material to form independent compartments within the compost bin, the material mentioned may be shade cloth stitched correctly so that it wraps around the framework sufficiently to be stitched onto itself forming an outer sleeve, the inside junction point where the material would join may only need stitching as a means of support due to the tension at opposing angles created by the framework and no measures need be taken for the external support of the compost itself, as this is provided by the compost bin into which The Worm Farm Organiser Insert for Compost Bins will be inserted.

In another form of the invention the entire product, the hubs, frame and barriers may be mode of moulded plastic, the hubs each having three hollow sections designed to accommodate and key in the profile of the framework and retain the framework in a perpendicular position when assembled, the framework in the moulded plastic form of this invention would need further reinforcement, firstly the framework would be constructed in the form of a "D" shape to provide reinforcement to the moulded plastic barrier, secondly as the barrier in this form of the invention is also constructed of moulded plastic it too would require reinforcement and would require a suitable number of correctly sized holes to provide suitable airflow and drainage.

In yet another form of the invention the hubs and frame would be made of moulded plastic and the barriers would be of suitable woven material, possibly shade cloth, suitably attached to the "D" shaped frames by means of the frames being made in two parts which would sandwich the shade cloth between them securing it with moulded studs and nuts.

To assist with understanding the invention, reference will now be made to the accompanying drawings which show one example of the invention.

Figure 1:
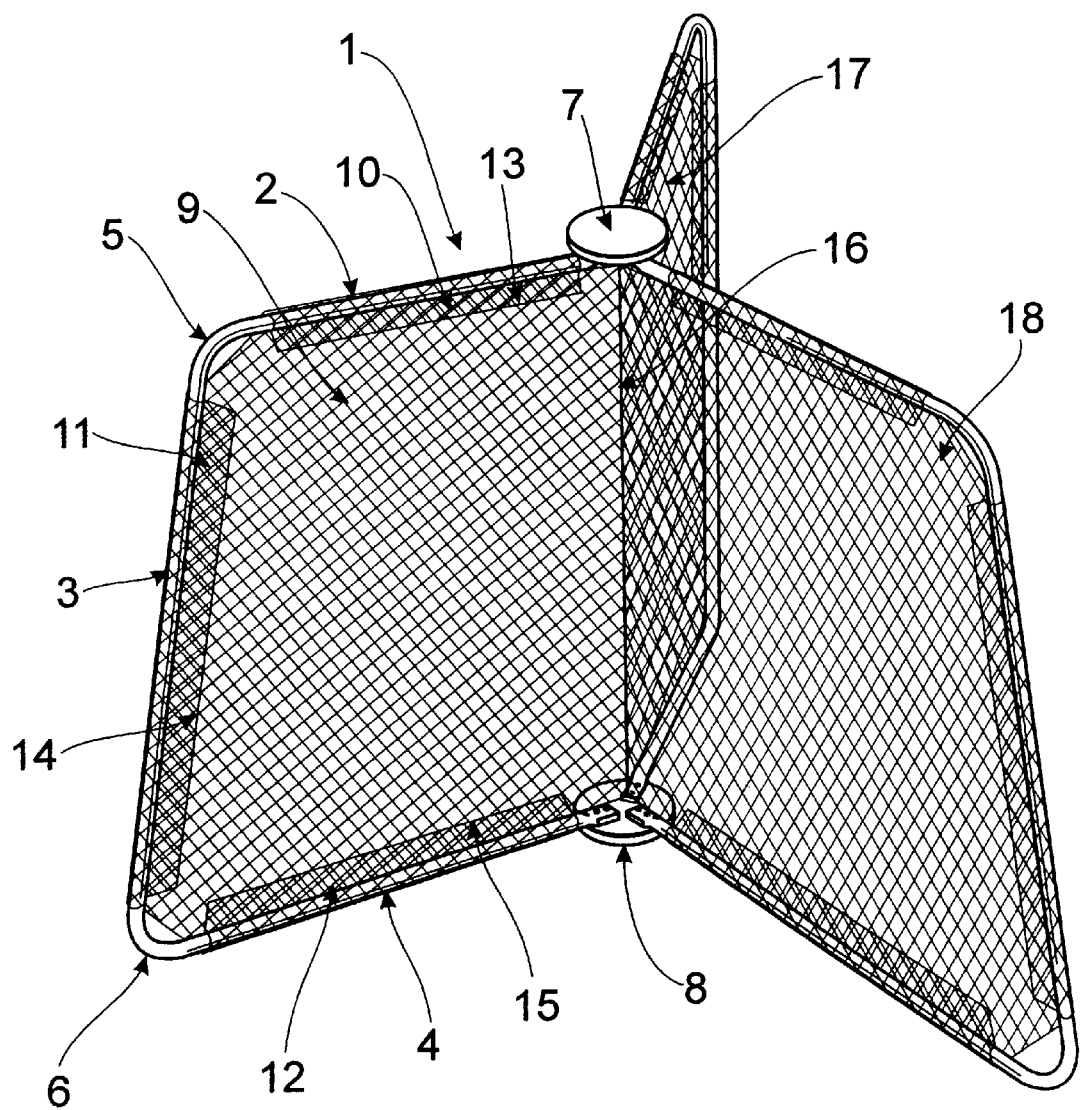
FIG. 1 shows one example of a Worm Farm Organiser Insert for Compost Bins according to this invention.

Referring to FIG. 1 it can be seen that The Worm Farm Qrganiser Insert for Compost Bins according to this invention comprises a frame 1 being constructed of suitable metal of appropriate length 2, 3 and 4 and having angles 5 and 6 of appropriate size to create the shape necessary to neatly fit the compost bin for which it is being manufactured. The frame is attached to the hub 7 and a similar hub assembly is provided at the base 8. A suitably manufactured material 9, possibly shade cloth wraps around the frame at 10, 11 and 12 and is attached by sewing at 13, 14 and 15. A suitably stitched junction is formed where the cloth joins and forms a perpendicular seam in the centre 16, when assembled.

This design is repeated in frames 17 and 18.

Figure 2:
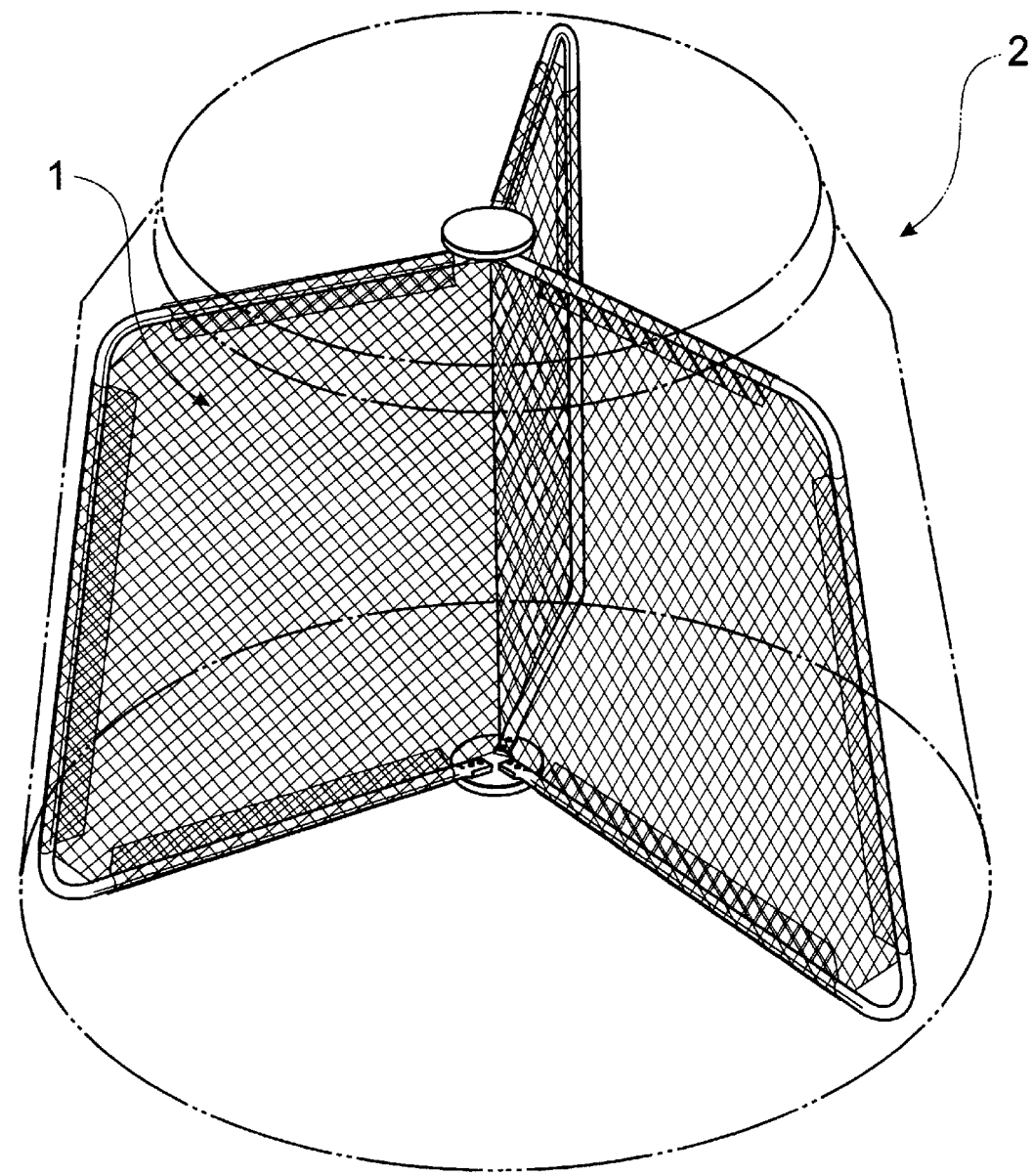
FIG. 2 shows the application of such Worm Farm Organiser Insert for Compost Bins actually inserted into a compost bin.

Referring to FIG. 2 shows the Worm Form Orgoniser Insert for Compost Bins 1 positioned within a compost bin 2.

Figure 3:
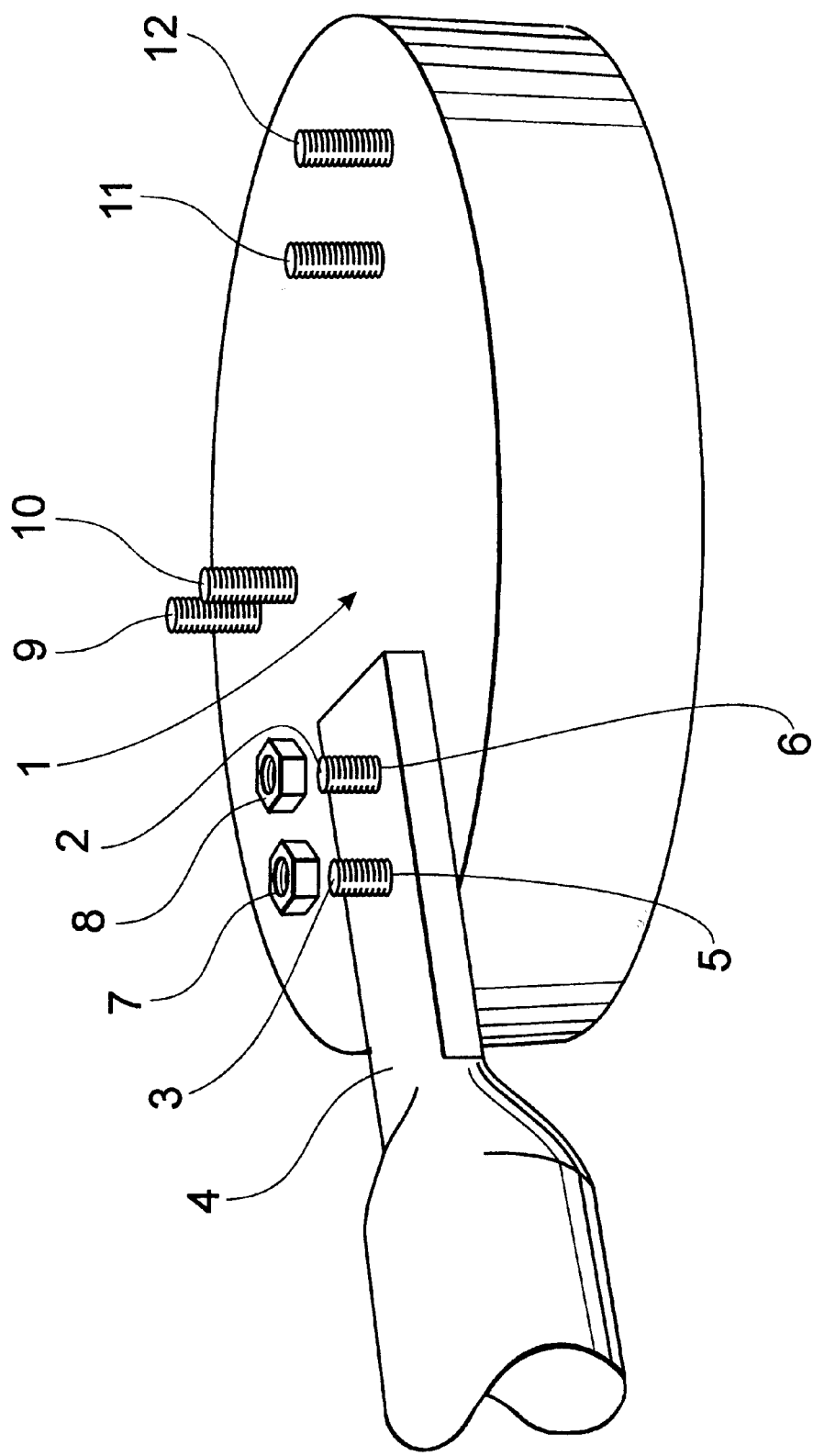
FIG. 3 shows the detail of a framework attachment to the hub as seen from underneath.

Referring to FIG. 3 it can be seen that the detail of a framework attachment to the hub as seen from underneath according to this invention comprises a hub 1 comprised of moulded resin or plastic having suitable metal or plastic threaded studs 2 and 3, 9 and 10, 11 and 12 moulded within them and protruding from the base thereof. The studs 2 and 3,9 and 10, 11 and 12 are positioned so as to arrange the "C" shaped frames to radiate from the hub and form three equally sized open sided sections. The framework 4 is positioned to allow the protruding studs to pass through the holes 5 and 6 neatly and be secured by suitable metal or plastic nuts 7 and 8.

A similar hub attachment is provided at the base of the framework.

By the use of the Worm Farm Organiser Insert for Compost Bins the maintenance of the correct environment for the production of quality compost in commercially available domestic anaerobic style compost bins becomes significantly simplified. The environment then created becomes an improved habitat for compost worms which when added to the compost aerate and consume the compost leaving worm castings.

It will be realised The Worm Farm Organiser Insert for Compost Bins according to this invention is not restricted to the form of a suitable metal or plastic frame and hub with a suitably manufactured material, possibly shade cloth forming barriers as shown in the example, but may be formed entirely from moulded plastic or moulded plastic and shade cloth.

The claims defining the invention are as follows.:

1. An insert for a compost bin, comprising:

upper and lower centrally located hubs;

three frames secured to and extending radially from the hubs, the frames shaped to fit a compost bin; and fluid pervious material attached to each of the frames;

wherein the material and the frames form three vertical barriers to divide an internal space of a compost bin into three substantially equal compartments.

2. The insert for a compost bin as claimed in claim 1, wherein the frames are generally "C" shaped.

3. The insert for a compost bin as claimed in claim 1, further comprising:

at least three screw-threaded studs protruding from a base of each of the hubs;

two flattened ends on each of the frames, the flattened ends each having at least one hole to receive a corresponding screw-threaded stud; and a plurality of nuts each engaging a corresponding screw-threaded stud to thereby secure the frames to the hub.

4. The insert for a compost bin as claimed in claim 3, wherein the hubs are formed from molded plastic.

5. The insert for a compost bin as claimed in claim 3, wherein the hubs are formed from molded resin.

6. The insert for a compost bin as claimed in claim 3, further comprising:

a plurality of sleeves each receiving a part of a corresponding frame and having been formed from the fluid pervious material, wherein the fluid pervious material is secured to the frame by the sleeve.

7. The insert for a compost bin as claimed in claim 1, wherein the fluid pervious material comprises shadecloth.

8. The insert for a compost bin as claimed in claim 1, further comprising:

a central junction formed by stitching a material covering one of the frames to a corresponding material covering each of the frames.

9. The insert for a compost bin as claimed in claim 1, wherein the frames are formed from metal.

10. The insert for a compost bin as claimed in claim 1, wherein the hubs and barriers are formed from molded plastic, said barriers having a plurality of penetrating holes to provide airflow and drainage passages.

11. The insert for a compost bin as claimed in claim 7, further comprising:

three hollow sections in each of the hubs, the hollow sections each dimensioned to receive and key in a frame member for thereby supporting a corresponding barrier in a substantially vertical position.

12. The insert for a compost bin as claimed in claim 8, wherein the frames are generally D-shaped.

13. The insert for a compost bin as claimed in claim 1, wherein the frames are generally C-shaped.

14. The insert for a compost bin as claimed in claim 6, wherein the fluid pervious material comprises shadecloth.

* * * * *